United States Patent
Kim et al.

(10) Patent No.: US 8,298,654 B2
(45) Date of Patent: Oct. 30, 2012

(54) TILE TYPE FLOORING IN WHICH PRINTING AND CUTTING PATTERNS ARE HARMONIOUS AND PROCESS FOR PREPARING THE SAME

(75) Inventors: Gyu-Yull Kim, Cheongju-si (KR); Chang-Hwan Park, Cheongju-si (KR)

(73) Assignee: LG Chem Ltd. (KR)

(*) Notice: Subject to any disclaimer, the term of this patent is extended or adjusted under 35 U.S.C. 154(b) by 453 days.

(21) Appl. No.: 11/572,190

(22) PCT Filed: Aug. 17, 2006

(86) PCT No.: PCT/KR2006/003221
§ 371 (c)(1),
(2), (4) Date: Jan. 16, 2007

(87) PCT Pub. No.: WO2007/052885
PCT Pub. Date: May 10, 2007

(65) Prior Publication Data
US 2008/0305312 A1    Dec. 11, 2008

(30) Foreign Application Priority Data
Nov. 7, 2005   (KR) .................... 10-2005-0105819

(51) Int. Cl.
*B32B 3/02*    (2006.01)
*B32B 38/10*   (2006.01)
(52) U.S. Cl. ............... 428/203; 428/195.1; 156/256
(58) Field of Classification Search ........... 428/195.1, 428/203; 156/256
See application file for complete search history.

(56) References Cited

U.S. PATENT DOCUMENTS

| | | | | |
|---|---|---|---|---|
| 3,787,259 A | * | 1/1974 | Kleinfeld et al. | 156/78 |
| 4,452,604 A | * | 6/1984 | Lenox et al. | 8/471 |
| 6,911,245 B2 | * | 6/2005 | Beistline et al. | 428/89 |

(Continued)

FOREIGN PATENT DOCUMENTS

JP        62127225        6/1987

(Continued)

OTHER PUBLICATIONS

PCT International Search Report for International Application No. PCT/KR2006/003221; International Filing Date: Aug. 17, 2006; Mailing date: Nov. 23, 2006.

*Primary Examiner* — Gerard Higgins
*Assistant Examiner* — Sathavaram I Reddy
(74) *Attorney, Agent, or Firm* — Cantor Colburn LLP

(57) ABSTRACT

A tile type flooring in which printing and cutting patterns coincide with each other, and a process for preparing the same. Band pattern portions (32) are respectively formed at neighboring two sides of each of main pattern portions (31) and synchronizing cutting is performed. Thereby, the total width of the band pattern portions (32) of each of tiles is uniformly narrowed. The tile type flooring has an aesthetic external appearance, and the tiles are naturally connected, thus expressing the reality of natural resources and the luxurious appearance. Further, if necessary, the flooring employs a size reinforcing layer (50) and has a transparent layer (20) and a first base layer (40), and a second base layer (60) and a balance layer (70), which are symmetrically stacked on the upper and lower surfaces of the size reinforcing layer (50), thus reducing defects caused by size instability of the flooring.

11 Claims, 2 Drawing Sheets

U.S. PATENT DOCUMENTS

| | | |
|---|---|---|
| 6,933,043 B1 | 8/2005 | Son et al. |
| 2002/0172796 A1 * | 11/2002 | Magee et al. .................. 428/85 |

FOREIGN PATENT DOCUMENTS

| | | | |
|---|---|---|---|
| JP | 5263371 | | 10/1993 |
| KR | 20-0299622 | | 1/2003 |
| KR | 10-2002-0083842 | * | 7/2004 |
| KR | 1020040057225 | | 7/2004 |
| KR | 10-2004-0075443 | * | 8/2004 |
| KR | 1020040075443 | | 8/2004 |
| WO | WO 0100406 A1 | * | 1/2001 |

* cited by examiner

TILE TYPE FLOORING IN WHICH PRINTING AND CUTTING PATTERNS ARE HARMONIOUS AND PROCESS FOR PREPARING THE SAME

This application claims the benefit of the filing date of Korean Patent Application No. 10-2005-0105819 filed on Nov. 7, 2005 in the Korean Intellectual Property Office, the disclosure of which is incorporated herein in its entirety by reference.

BACKGROUND (a) Technical Field

The present invention relates to a tile type flooring, and more particularly to a tile type flooring in which printing and cutting patterns coincide with each other through synchronizing cutting.

(b) Related Art

Generally, a tile type flooring is prepared by forming a printing layer by performing gravure printing or transfer printing on a white vinyl chloride resin sheet, and applying transparent vinyl chloride resin to the printing layer for protecting the printing layer, thereby expressing an aesthetic external appearance. Further, embossed portions are formed on the surface of the flooring. However, after construction, the conventional tile type flooring has a monotonous external appearance.

In order to avoid the monotonous external appearance of the tile type flooring, a PVC tile product has been proposed. The PVC tile product is prepared by forming a band pattern portion on a sheet at each of four sides of a block pattern portion having a designated pattern and pattern-matching cutting the sheet, thus not having a monotonous external appearance after construction.

In the above tile product, the band pattern portions formed at the four sides of the block pattern portion need to have a narrow width so as to naturally connect tiles and provide the fine external appearance of the tile product. However, since a width deviation of the band pattern portions is severe when cutting, it is difficult to obtain uniform widths of the band pattern portions. Further, the reduction of the widths of the band pattern portions is limited. In terms of characteristics of the vinyl chloride resin, heat and pressure expands and contracts the tile product, thus causing many defects when the synchronizing cutting is performed.

Korean Patent Laid-open No. 2004-75443 discloses a multi-step printed vinyl flooring. The multi-step printed vinyl flooring includes a multi-step printed pattern and a transparent layer formed on the pattern. The multi-step printed pattern is prepared by printing a pattern on an upper layer formed on a base layer using a pearl ink, mechanically or chemically forming prominences and depressions on the upper surface of the upper layer provided with the printed pattern, and printing another pattern on the prominences using the pearl ink. The harmony of the multi-step printed pattern made of the pearl ink and the prominences and depressions, causing a diffusion reflection effect, provides a three-dimensional external appearance of the flooring.

Korean Utility Model Registration No. 299622 discloses a flooring having a multiple three-dimensional pattern. The flooring includes, from the bottom, an inner layer, a base layer, and an outer layer. The outer layer includes a multiple three-dimensional pattern layer including a pearl color, a transparent filling layer, a printing layer, and a transparent layer, which are sequentially stacked from the bottom. The flooring has an improved clearness of the printed pattern and a high three-dimensional texture.

Therefore, the present invention has been made in view of the above problems, and it is an object of the present invention to provide a tile type flooring, in which the total width of band pattern portions of each of tiles are uniformly narrowed so as to be naturally connect the tiles, express an aesthetic external appearance after construction, and prevent defects generated when synchronizing cutting is performed, and a process for preparing the same.

BRIEF SUMMARY

In accordance with one aspect of the present invention, the above and other objects can be accomplished by the provision of a tile type flooring comprising a printing layer having main pattern portions and band pattern portions formed around each of the main pattern portions, wherein the band pattern portions are respectively formed at neighboring two sides out of four sides of each of the main pattern portions.

Synchronizing cutting is performed in such a manner that band pattern portions are formed at the neighboring two sides of each of the main pattern portions, having a block shape. Accordingly, the flooring of the present invention reduces the total width of the band patterns of each of tiles to a half of that of a conventional flooring, in which band pattern portions are respectively formed at four sides of each of main pattern portions. Thus, the flooring of the present invention expresses an aesthetic external appearance after construction and allows the tiles to be naturally connected.

That is, supposing that the width of each of the band pattern portions is T, the total width of the band pattern portions of each of tiles of the conventional flooring is 2T, but the total width of the band pattern portions of each of tiles of the flooring of the present invention is T.

By the above synchronizing cutting, the total width of the band patterns of each of the tiles is narrowed, and the deviation of the band patterns generated from the cutting is reduced.

Preferably, the band pattern portions formed at the neighboring two sides of each of the main pattern portions have the same width, so as to easily connect the tiles, when the flooring is constructed, and provide the uniform external appearance of the flooring after construction.

The printing layer is printed on a non-plasticized white sheet. Preferably, in order to minimize the deformation of a printed pattern, the white sheet does not contain a plasticizer.

Preferably, the tile type flooring further comprises a size reinforcing layer. Different from sheet type floorings, most conventional tile type floorings did not have a size reinforcing layer. However, the tile type flooring of the present invention employs the size reinforcing layer, thus improving size stability of the flooring and minimizing the deformation of the printed pattern.

More preferably, the tile type flooring further comprises, from the top, a transparent layer stacked on the printing layer, a first base layer stacked on the size reinforcing layer, a second base layer, and a balance layer. That is, the transparent layer and the first base layer, and the second base layer and the balance layer are symmetrically stacked on the upper and lower surfaces of the size reinforcing layer, thus preventing the flooring from coming undone from the floor.

Further, the above symmetrical stack structure reduces defects caused by size instability of the flooring when the synchronizing cutting is performed.

Preferably, the first base layer and the second base layer have the same composition and the same thickness, and the transparent layer and the balance layer have the same composition and the same thickness. However, in order to reduce the production costs of the flooring, the thickness of the first base layer is a half to a third of the thickness of the second base layer, and is preferably a half of the thickness of the second base layer, and the thickness of the balance layer may be five-tenths to nine-tenths of the thickness of the transparent layer, and is preferably nine-tenths of the thickness of the transparent layer.

In accordance with another aspect of the present invention, there is provided a process for preparing a tile type flooring comprising printing main pattern portions and band pattern portions, formed around each of the main pattern portions, on a white sheet; preparing a printing layer by performing synchronizing cutting of the white sheet in such a manner that the band pattern portions are respectively formed at neighboring two sides out of four sides of each of the main pattern portions; and stacking the printing layer on a multi-layer structure.

Preferably, the white sheet is cut in such a manner that the band pattern portions formed at the neighboring two sides of each of the main pattern portions have the same width.

The flooring of the present invention is obtained by performing synchronizing cutting of a sheet in such a manner that the band pattern portions are respectively formed at neighboring two sides out of four sides of each of the main pattern portions, thus expressing a luxurious external appearance after construction.

The synchronizing cutting means a pattern-matching cutting. For example, after a flower pattern is printed on a sheet, the sheet is cut into tiles in such a manner that the flower pattern portion is disposed at the center of each of the tiles.

In the present invention, the main pattern portions are main printing matters formed on the tiles, each having a block shape, and have a pattern, such as a tree pattern, a stone pattern, a fabric pattern, or a pattern expressing the grain of wood or stone or the texture of fabric.

Further, the band pattern portions are sub printing matters formed around each of the main pattern portions, and have a stripe pattern, which corresponds to lines formed at connection portions of the tiles, which are connected by cement in a place, such as a bathroom.

The present invention provides a tile type flooring, in which band pattern portions are respectively formed at neighboring two sides out of four sides of each of main pattern portions and synchronizing cutting is performed, thus uniformly narrowing the total width of the band pattern portions of each of tiles. The tile type flooring has an aesthetic external appearance, after construction, and tiles are naturally connected, thus expressing the reality of natural resources (tree, stone, and fabric) and the luxurious appearance.

Further, if necessary, the flooring of the present invention employs a size reinforcing layer and has a transparent layer and a first base layer, and a second base layer and a balance layer, which are symmetrically stacked on the upper and lower surfaces of the size reinforcing layer, thus reducing defects caused by size instability of the flooring when the synchronizing cutting is performed.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, a tile type flooring in accordance with the present invention will be described in detail with reference to the annexed drawings.

Figure 1:
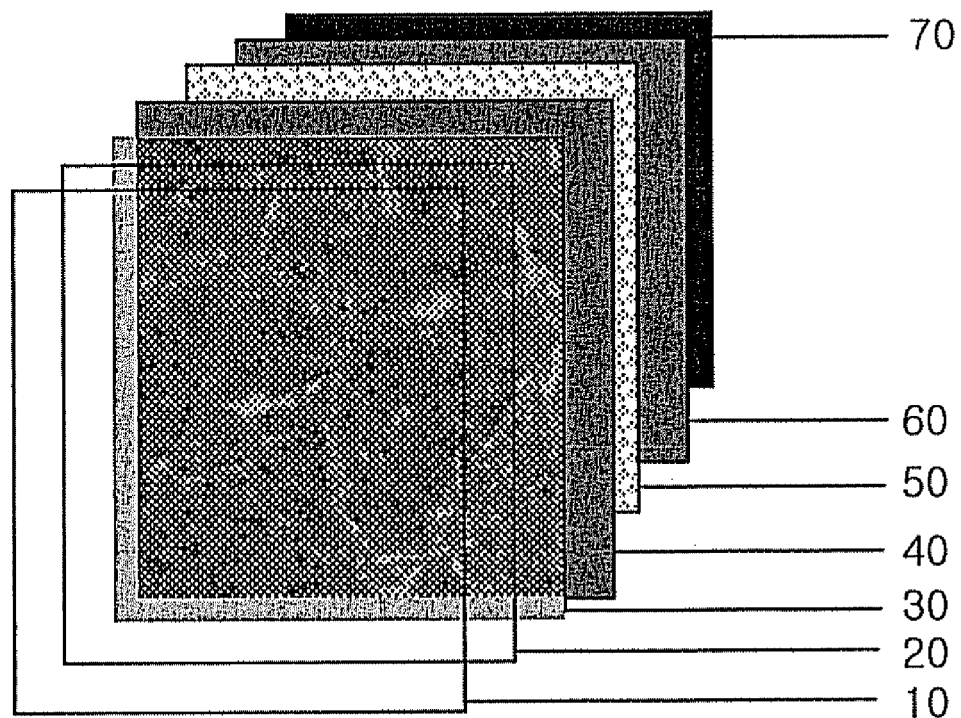
FIG. 1 is an exploded perspective view of a flooring in accordance with one embodiment of the present invention.
Figure 2:
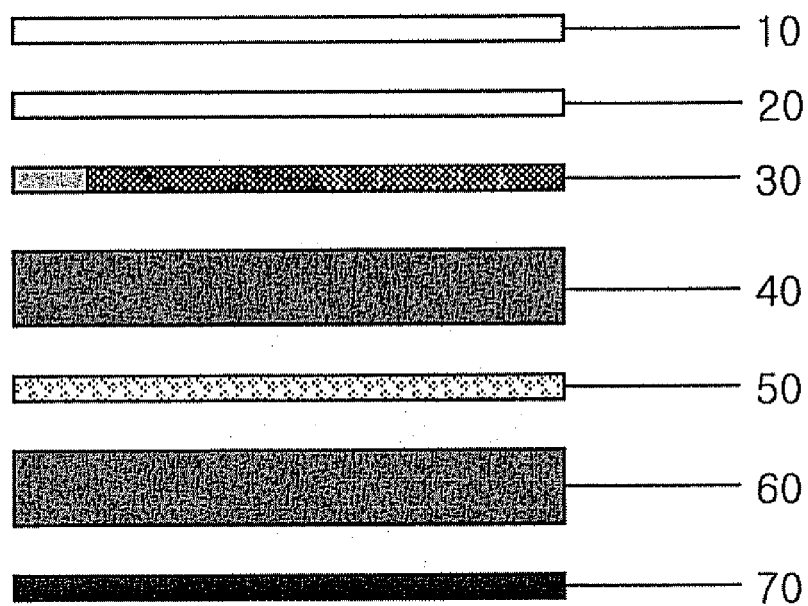
FIG. 2 is a sectional view of the flooring of FIG. 1.

FIG. 1 is an exploded perspective view of a flooring in accordance with one embodiment of the present invention, and FIG. 2 is a sectional view of the flooring of FIG. 1. As shown in FIGS. 1 and 2, the flooring comprises, from the top, a surface treatment layer 10, a transparent layer 20, a printing layer 30, a first base layer 40, a size reinforcing layer 50, a second base layer 60, and a balance layer 70.

The surface treatment layer 10 serves to provide properties of a product, such as anti-contamination, anti-scratch, anti-abrasion, and durability. The surface treatment layer 10 is formed by applying urethane acrylate-based resin and hardening the resin using ultraviolet rays.

The transparent layer 20 serves to protect the printing layer 30 and allows a printed pattern to be seen. The transparent layer 20 is made of a general vinyl chloride sheet.

The printing layer 30 serves to determine the external appearance of the product. Preferably, in order to minimize the deformation of the printed pattern, the printing layer 30 is printed on a non-plasticized white sheet.

The base layers 40 and 60 serve to provide size stability of the product. The base layers 40 and 60 are made of a general vinyl chloride sheet.

The size reinforcing layer 50 is made of a glass fiber sheet. In order to provide the size stability of the flooring after construction and to minimize the deformation of the printed pattern in synchronizing cutting, the size reinforcing layer 50 is obtained by impregnating the glass fiber sheet, which is prepared by properly mixing glass fiber, pulp, and a binder, with PVC sol, and gelling the obtained material.

The balance layer 70 is stacked on the lower surface of the second base layer 60, and serves to keep the balance of the product. The balance layer 70 is made of a general vinyl chloride sheet.

Different from a sheet type flooring, the tile type flooring of the present invention must not come undone from the floor. Accordingly, the size stability is one of the important properties of the tile type flooring of the present invention.

The tile type flooring of the present invention employs the size reinforcing layer 50, which is not used in a conventional tile type flooring, and has the transparent layer 20 and the first base layer 40, stacked on the upper surface of the size reinforcing layer 50, and the second base layer 60 and the balance layer 70, stacked on the lower surface of the size reinforcing layer 50, symmetrically. Accordingly, the tile type flooring of the present invention does not come undone from the floor, thus having drastically improved size stability.

Most preferably, the first base layer 40 and the second base layer 60, which are symmetrically stacked on the upper and lower surfaces of the size reinforcing layer 50, have the same composition and the same thickness, and the transparent layer 20 and the balance layer 70, which are symmetrically stacked on the upper and lower surfaces of the size reinforcing layer 50, have the same composition and the same thickness. However, in order to reduce production costs of the flooring, the first base layer 40 may have a thickness, which is a half to a third of that of the second base layer 60, and the balance layer 70 may have a thickness, which is five-tenths to nine-tenths of that of the transparent layer 20. The above thickness ratios do not influence the size stability of the flooring.

Figure 3:
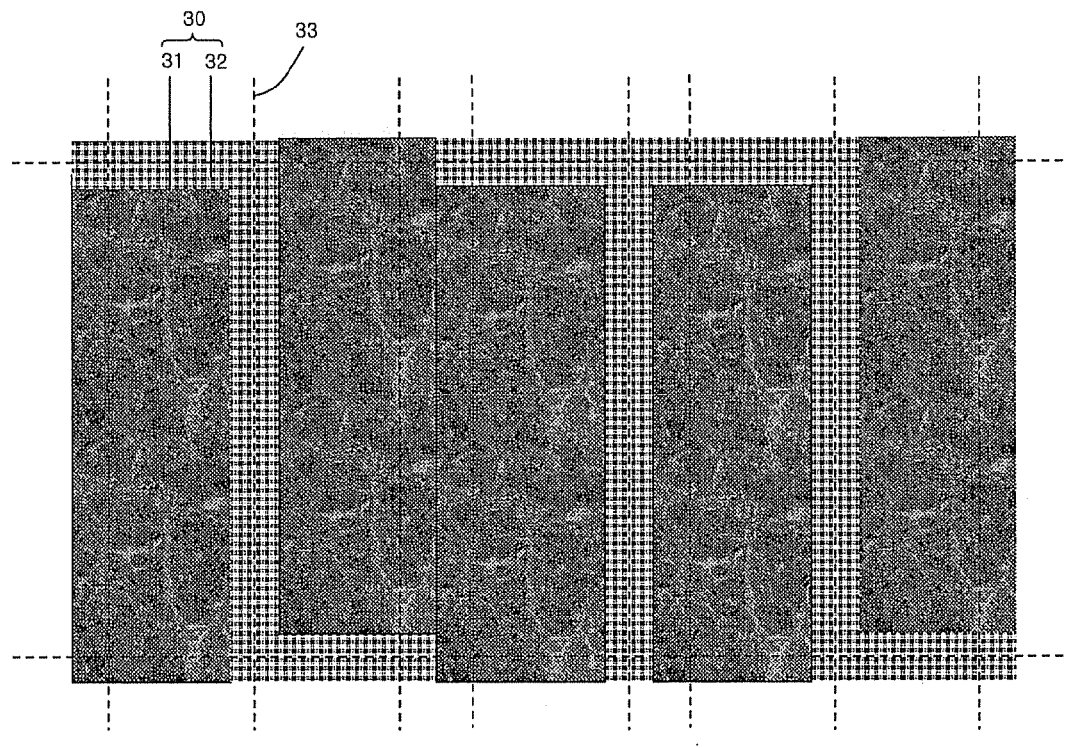
FIG. 3 is a plan view illustrating a printed pattern of the flooring in accordance with one embodiment of the present invention before cutting.

FIG. 3 is a plan view illustrating a printed pattern of the flooring in accordance with one embodiment of the present invention before cutting. As shown in FIG. 3, main pattern portions 31 and band pattern portions 32 are formed on a white sheet. For convenience of cutting, the band pattern portions 32 may be respectively printed at two sides of each of the main pattern portions 31, or may be respectively printed at four sides of each of the main pattern portions 31. The printed pattern is not limited to FIG. 3, but may be variously modified.

Figure 4:
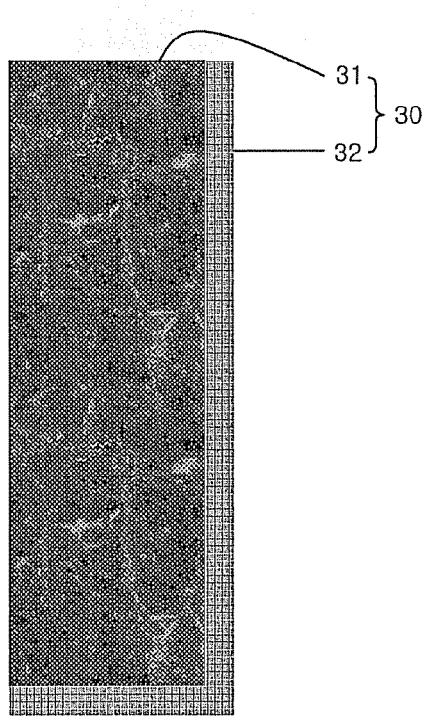
FIG. 4 is a plan view of a printing layer, which is obtained by synchronizing cutting along cutting lines of FIG. 3.

FIG. 4 is a plan view of the printing layer 30, which is obtained by synchronizing cutting along cutting lines 33 of FIG. 3. As shown in FIG. 4, the band pattern portions 32 having the same thickness are respectively formed at two sides of the main pattern portion 31.

Like the main pattern portions 31, the band pattern portions 31 may have a pattern, such as a tree pattern, a stone pattern, a fabric pattern, or a pattern expressing the grain of wood or stone or the texture of fabric, or may have a solid color without a pattern.

When the flooring of the present invention is constructed, four tiles make up a group in such a manner that the main pattern portions 31 face each other. Thereby, the band pattern portions 31 formed at the two sides of each of the main pattern portions 31 are connected, thus forming the edge of the group made up by the four tiles. Accordingly, the four tiles can be naturally connected.

Hereinafter, a process for preparing the flooring of the present invention, as shown in FIGS. 1 and 2, will be described in brief.

First, a glass fiber sheet of 45~60 g/m² is impregnated with a PVC sol, and the obtained material is gelled in a gelling drum at a temperature 150~170° C., thereby forming the size reinforcing layer 50.

Thereafter, a desired pattern, such as a tree pattern, a stone pattern, or a fabric pattern, is printed on a white sheet, thereby forming the printing layer 30. The white sheet having a thickness of 0.09~0.1 mmT is manufactured by rolling a vinyl chloride resin composite, which does not contain a plasticizer, using a calender at a temperature of 170~180° C. In order to prevent the printed pattern from being spread, the drying temperature of an ink used is less than 30° C.

Thereafter, the transparent layer 20, the first base layer 40, the second base layer 60, and the balance layer 70, each of which has a designated thickness, are manufactured by sheeting vinyl chloride resin composites, which are variously prescribed according to the layers, using a two-roll or four-roll calender at a temperature of 140~180° C.

Thereafter, the balance layer 70, the second base layer 60, the size reinforcing layer 50, the first base layer 40, the printing layer 30, and the transparent layer 20 are sequentially stacked in a bonding apparatus, which performs heating and cooling operations at a designate pressure, and are bonded under the conditions of a pressure of 5~10 kgf/cm², a heating temperature 145~155° C., a heating time of 20~25 minutes, a cooling temperature of 25~30° C., and a cooling time of 20~25 minutes, thereby preparing a first semi-finished product.

Thereafter, a UV curable urethane acrylate-based resin is applied to the upper surface of the transparent layer 20 of the first semi-finished product, and is cured by irradiating ultraviolet rays thereon, thereby preparing a second semi-finished product including the surface treatment layer 10.

Finally, synchronizing cutting of the second semi-finished product is performed using a cutting machine, thereby completing the tile type flooring of the present invention.

EXAMPLE

All layers except for the size reinforcing layer 50 were manufactured using a calender.

First, a glass fiber sheet of 50 g/m² was impregnated with a PVC sol having a composition stated in Table 1, and the obtained material was gelled in a gelling drum at a temperature 160° C., thereby forming the size reinforcing layer 50.

Thereafter, a white sheet having a composition stated in Table 1 and a thickness of 0.1 mmT was manufactured by rolling using the calender at a temperature of 170° C. The main pattern portions 31 and the band pattern portions 32 were printed on the white sheet according to the pattern of FIG. 3 using a gravure press, thereby forming the printing layer 30. Here, an ink used was dried at a temperature of 30° C. for 10 seconds.

Thereafter, the transparent layer 20 having a composition stated in Table 1 was manufactured using the calender by rolling at a temperature of 150° C.

Thereafter, the first base layer 40 and the second base layer 60 having a composition stated in Table 1 were manufactured using the calender by rolling at a temperature 150° C.

Thereafter, the balance layer 70 having a composition stated in Table 1 was manufactured using the calender by rolling at a temperature of 170° C.

Thereafter, the balance layer 70, the second base layer 60, the size reinforcing layer 50, the first base layer 40, the printing layer 30, and the transparent layer 20 were sequentially stacked in the bonding apparatus, and were bonded under the conditions of a pressure of 5 kgf/cm², a heating temperature 150° C., a heating time of 20 minutes, a cooling temperature of 25° C., and a cooling time of 20 minutes, thereby preparing a first semi-finished product.

Thereafter, a UV curable urethane acrylate-based resin was applied to the upper surface of the transparent layer 20 of the first semi-finished product, and was cured by irradiating ultraviolet rays thereon, thereby forming the surface treatment layer 10 having a thickness of 20 μm. Thereby, a second semi-finished product of FIG. 1 was manufactured.

Finally, synchronizing cutting of the second semi-finished product was prepared using a cutting machine, thereby completing the tile type flooring of the present invention having the main pattern portions 31 and the band pattern portions 32 having the same width, which are formed at two sides of the main pattern portion 31.

TABLE 1

| Division | Components | Content (weight by part) |
|---|---|---|
| PVC sol | PVC resin: polymerization degree of 1,700 | 100 |
| | Plasticizer: dioctyl phthalate (DOP) | 60 |
| | Heat-resistant additive: epoxy | 3 |
| | Secondary plasticizer: D-240R | 20 |
| | Filler: calcium carbonate | 150 |
| | Stabilizer: Ba—Zn based stabilizer | 3 |
| Transparent layer | PVC resin: polymerization degree of 1,000 | 100 |
| | Plasticizer: DOP | 32 |
| | Heat-resistant additive: epoxy | 3 |
| | Stabilizer: Ba—Zn based stabilizer | 3 |
| White sheet layer | PVC resin: polymerization degree of 700 | 100 |
| | Heat-resistant additive: epoxy | 3 |
| | Stabilizer: Ba—Zn based stabilizer | 3 |

TABLE 1-continued

| Division | Components | Content (weight by part) |
|---|---|---|
| First and second base layers | PVC resin: polymerization degree of 1,000 | 100 |
| | Plasticizer: DOP | 32 |
| | Processing aid: PA-828DP (LG Chem. Ltd.) | 9 |
| | Filler: calcium carbonate | 500 |
| | Stabilizer: Ba—Zn based stabilizer | 3 |
| Balance layer | PVC resin: polymerization degree of 700 | 100 |
| | Plasticizer: DOP | 36 |
| | Heat-resistant additive: epoxy | 3 |
| | Filler: calcium carbonate | 40 |
| | Stabilizer: Ba—Zn based stabilizer | 3 |

Industrial Applicability

As apparent from the above description, the present invention provides a tile type flooring, in which band pattern portions are respectively formed at neighboring two sides out of four sides of each of main pattern portions and synchronizing cutting is performed, thus uniformly narrowing the total width of the band pattern portions of each of tiles. The tile type flooring has an aesthetic external appearance, after construction, and tiles are naturally connected, thus expressing the reality of natural resources (tree, stone, and fabric) and the luxurious appearance.

Further, if necessary, the flooring of the present invention employs a size reinforcing layer and has a transparent layer and a first base layer, and a second base layer and a balance layer, which are symmetrically stacked on the upper and lower surfaces of the size reinforcing layer, thus reducing defects caused by size instability of the flooring when the synchronizing cutting is performed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A tile type flooring comprising a transparent layer, a printing layer, a first base layer, a size reinforcing layer, a second base layer, and a balance layer in the described order,
    wherein the size reinforcing layer is disposed between the first base layer and the second base layer, the first base layer and the second base layer are both made of the same composition including polyvinyl chloride, and the size reinforcing layer is made of a glass fiber sheet impregnated with polyvinyl chloride gel wherein the glass fiber sheet has a density of 45 to 60 $g/m^2$,
    wherein the transparent layer and the balance layer have the same thickness, and
    wherein the printing layer has main pattern portions and band pattern portions formed around each of the main pattern portions in such a manner that the band pattern portions are positioned at neighboring two sides out of four sides of each of the main pattern portions when a pattern-matching cutting is performed.

2. The tile type flooring according to claim 1, wherein the band pattern portions positioned at the neighboring two sides of each of the main pattern portions have the same width.

3. The tile type flooring according to claim 1, wherein the printing layer is formed by printing on a non-plasticized white sheet.

4. The tile type flooring according to claim 1, wherein the first base layer and the second base layer have the same thickness, and the transparent layer and the balance layer have the same composition.

5. The tile type flooring according to claim 1, wherein the thickness of the first base layer is a half to a third of the thickness of the second base layer.

6. A tile type flooring comprising a transparent layer, a printing layer, a first base layer, a size reinforcing layer, a second base layer, and a balance layer in the described order,
    wherein the size reinforcing layer is disposed between the first base layer and the second base layer, the first base layer and the second base layer are both made of the same composition including polyvinyl chloride, and the size reinforcing layer is made of a glass fiber sheet impregnated with polyvinyl chloride gel, wherein the glass fiber sheet has a density of 45 to 60 $g/m^2$,
    wherein the thickness of the balance layer is five-tenths to nine-tenths of the thickness of the transparent layer, and
    wherein the printing layer has main pattern portions and band pattern portions formed around each of the main pattern portions in such a manner that the band pattern portions are positioned at neighboring two sides out of four sides of each of the main pattern portions when a pattern-matching cutting is performed.

7. The tile type flooring according to claim 6, wherein the band pattern portions positioned at the neighboring two sides of each of the main pattern portions have the same width.

8. The tile type flooring according to claim 6, wherein the printing layer is formed by printing on a non-plasticized white sheet.

9. The tile type flooring according to claim 6, wherein the first base layer and the second base layer have the same thickness.

10. The tile type flooring according to claim 6, wherein the transparent layer and the balance layer have the same composition.

11. The tile type flooring according to claim 6, wherein the thickness of the first base layer is a half to a third of the thickness of the second base layer.

* * * * *